(12) United States Patent
Wang et al.

(10) Patent No.: US 6,291,068 B1
(45) Date of Patent: Sep. 18, 2001

(54) THERMOPLASTIC RESIN-COATED AMMONIUM POLYPHOSPHATE AND PROCESS FOR THE PREPARATION THEREOF

(75) Inventors: Guo-fang Wang; Noriaki Narita; Takafumi Takebayashi, all of Yokohama (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/254,120

(22) PCT Filed: Jun. 24, 1998

(86) PCT No.: PCT/JP98/02815

§ 371 Date: Feb. 26, 1999

§ 102(e) Date: Feb. 26, 1999

(87) PCT Pub. No.: WO99/00323

PCT Pub. Date: Jul. 1, 1999

(30) Foreign Application Priority Data

Jun. 26, 1997 (JP) .................................................. 9-185934

(51) Int. Cl.[7] ................................. B32B 5/16; B01J 13/18
(52) U.S. Cl. .......................... 428/403; 428/407; 428/921; 427/213.34
(58) Field of Search ................................... 428/403, 407, 428/920; 427/213.34

(56) References Cited

U.S. PATENT DOCUMENTS

| | | | |
|---|---|---|---|
| 3,969,291 | * 7/1976 | Fukuba et al. | 260/17.3 |
| 4,347,334 | 8/1982 | Staendeke et al. . | |
| 4,467,056 | * 8/1984 | Staendeke et al. | 523/208 |
| 4,514,328 | 4/1985 | Staendeke et al. . | |
| 4,515,632 | 5/1985 | Maurer et al. . | |
| 4,853,424 | * 8/1989 | Staendeke et al. | 523/506 |
| 5,071,901 | 12/1991 | Chakrabarti et al. . | |
| 5,109,037 | 4/1992 | Chakrabarti et al. . | |
| 5,137,937 | * 8/1992 | Huggard et al. | 523/179 |
| 5,162,418 | 11/1992 | Chakrabarti et al. . | |
| 5,164,437 | 11/1992 | Chakrabarti et al. . | |
| 5,312,853 | * 5/1994 | Staendeke et al. | 524/100 |
| 5,599,626 | * 2/1997 | Fukumura et al. | 428/403 |
| 5,629,382 | * 5/1997 | Cipolli et al. | 525/158 |
| 5,700,575 | * 12/1997 | Iwata et al. | 428/403 |
| 5,795,930 | * 8/1998 | Fukumura et al. | 524/100 |
| 5,945,467 | * 8/1999 | Iwata et al. | 523/205 |
| 5,998,503 | * 12/1999 | Jacobson et al. | 523/210 |
| 6,008,349 | * 12/1999 | Suzuki et al. | 544/195 |
| 6,015,510 | * 1/2000 | Jacobson et al. | 252/609 |
| 6,110,559 | * 8/2000 | De Keyser | 428/68 |

FOREIGN PATENT DOCUMENTS

| | | |
|---|---|---|
| 52-39930 | 10/1977 | (JP) . |
| 53-15478 | 5/1978 | (JP) . |
| 61-101514 | 5/1986 | (JP) . |
| 61-98719 | 5/1986 | (JP) . |
| 61-98721 | 5/1986 | (JP) . |
| 61-98722 | 5/1986 | (JP) . |
| 61106643 | 5/1986 | (JP) . |
| 03131508 | 6/1991 | (JP) . |
| 4-20944 | 4/1992 | (JP) . |
| 4-55625 | 9/1992 | (JP) . |
| 6-24719 | 2/1994 | (JP) . |
| 06263416 | 9/1994 | (JP) . |
| 07277713 | 10/1995 | (JP) . |
| 09013037 | 1/1997 | (JP) . |
| 09040876 | 2/1997 | (JP) . |
| WO 92/08758 | 5/1992 | (WO) . |

* cited by examiner

Primary Examiner—H. Thi Le
(74) Attorney, Agent, or Firm—Leydig, Voit & Mayer, Ltd.

(57) ABSTRACT

Thermoplastic resin-coated ammonium polyphosphate comprises a core material which comprises ammonium polyphosphate and a thermosetting resin, a melamine monomer or a surface-treating agent; and a coating layer of a thermoplastic resin which covers the core material. The thermoplastic resin-coated ammonium polyphosphate is excellent in water resistance, resistance to acids, resistance to alkalis, resistance to ions and resistance to organic solvents and if it is incorporated into a resin composition as a component of a flame retardant used therein and the composition is formed into a molded article, the resulting article does not show any marked reduction of its mechanical strength.

21 Claims, No Drawings

THERMOPLASTIC RESIN-COATED AMMONIUM POLYPHOSPHATE AND PROCESS FOR THE PREPARATION THEREOF

TECHNICAL FIELD

The present invention relates to thermoplastic resin-coated ammonium polyphosphate which comprises a core material comprising ammonium polyphosphate and, for instance, a thermosetting resin, a melamine monomer or a surface-treating agent; and a particular thermoplastic resin covering the core material, a process for producing the coated ammonium polyphosphate and a flame retardant containing the same. More specifically, the present invention pertains to thermoplastic resin-coated ammonium polyphosphate which comprises a core material obtained by encapsulating, modifying or surface-treating ammonium polyphosphate with, for instance, a thermosetting resin, a melamine monomer or a surface-treating agent, or obtained by mixing ammonium polyphosphate with a melamine monomer; and a thermoplastic resin prepared by polymerizing a monomer having a plurality of specific functional groups and capable of undergoing two- or three-dimensional cross-linking reaction, as well as a process for producing the coated ammonium polyphosphate and a flame retardant containing the same.

BACKGROUND ART

Heretofore, ammonium polyphosphate has been used and added to paper, wood, synthetic resins or the like as a component for a flame retardant used therein. However, ammonium polyphosphate is water-soluble by nature and therefore, has such characteristic properties that it is highly susceptible to hydrolysis under a high temperature condition. A resin composition in which such un-treated ammonium polyphosphate is blended or an article obtained by molding the resin composition is also inferior in water resistance due to the water-solubility of ammonium polyphosphate and is limited in the practical applications. Moreover, the un-treated ammonium polyphosphate is insufficient in the affinity for synthetic resins and accordingly, the molded article obtained using a resin composition to which the ammonium polyphosphate is added as a component for a flame retardant suffers from a problem in that the mechanical strength, appearance or the like of the molded article are largely impaired due to the presence of the polyphosphate.

To eliminate the drawbacks peculiar to the ammonium polyphosphate, there have been some proposals. Ammonium polyphosphate which is subjected to coating or encapsulation with a thermosetting resin is disclosed in, for instance, U.S. Pat. Nos. 4,467,056, 4,347,334 and 4,514,328; Japanese Examined Patent Publication (hereinafter referred to as "J.P. KOKOKU") Nos. Hei 4-20944 and Hei 4-55625; and Japanese Un-Examined Patent Publication (hereinafter referred to as "J.P. KOKAI") Nos. Sho 61-98719, Sho 61-98721, Sho 61-98722, Sho 61-101514, Hei 6-24719 and Hei 7-277713. In addition, ammonium polyphosphate which is treated, coated or modified with a melamine monomer is disclosed in J.P. KOKOKU Nos. Sho 52-39930, Sho 53-15478 and Hei 5-50536; U.S. Pat. No. 4,515,632; and Registered Japanese Patent No. 2,598,742. J.P. KOKAI No. Hei 3-131508 and PCT No. 9,208,758 disclose ammonium polyphosphate coated with a silicone resin. U.S. Pat. Nos. 5,071,901, 5,109,037, 5,162,418 and 5,164,437 disclose ammonium polyphosphate which is treated with a surface-treating agent.

However, all of the ammonium polyphosphate products produced according to the processes disclosed in the aforementioned prior arts suffer from problems in that they are insufficient in the affinity for thermoplastic resins and dispersibility therein and that the articles obtained by molding the compositions prepared by blending the products into resins have considerably reduced mechanical strength. In order for eliminating these problems, a halogen-free flame retardant which is coated with or encapsulated in a thermoplastic resin has recently been proposed in J.P. KOKAI Nos. Hei 9-40876 and Hei 9-13037.

However, the halogen-free flame retardant which is coated with a thermoplastic resin according to the process disclosed in these patents suffers from problems in that it is still insufficient in the chemical resistance such as acids, alkalis and organic solvents and that if the core material comprises ammonium polyphosphate, the flame retardant is not improved even in its water resistance.

The inventors of this invention have conducted various studies to obtain ammonium polyphosphate which is excellent in water resistance, resistance to acids, resistance to alkalis, resistance to ions and resistance to organic solvents and which can provide an article whose mechanical strength is not impaired to a considerable extent, when a composition is prepared by blending ammonium polyphosphate into a thermoplastic resin as a component of a flame retardant used therein and then molded into the article. As a result, the inventors have found out that the foregoing problems can be solved by providing a substance which comprises a specific core material containing such ammonium polyphosphate and a thermoplastic resin coating the core material, in particular, a coating layer of a thermoplastic resin consisting of a cross-linked polymer of a specific monomer having, in the molecule, 1 to 5 groups each carrying polymerizable double bond and have completed the present invention on the basis of the foregoing finding.

As will be clear from the foregoing, an object of the present invention is to provide a substance mainly comprising ammonium polyphosphate, which is excellent in water resistance and chemical resistance, which can provide an resin molded article whose mechanical strength is not impaired to a considerable extent by blending ammonium polyphosphate into a thermosetting or thermoplastic resin as a component of a flame retardant used therein and which has a high hygroscopicity-controlling effect, as well as a process for producing the same and a flame retardant containing the same.

DISCLOSURE OF THE INVENTION

The thermoplastic resin-coated ammonium polyphosphate according to the present invention is characterized in that it comprises a core material comprising ammonium polyphosphate and, for instance, a thermosetting resin, a melamine monomer or a surface-treating agent; and a coating layer of a thermoplastic resin covering the core material.

In the thermoplastic resin-coated ammonium polyphosphate of the present invention, the foregoing thermoplastic resin is desirably a member selected from the group consisting of homopolymers of a monomer represented by the following general formula 1 which has, in the molecule, 2 to 5 double bonds capable of undergoing polymerization; copolymers of at least two of these monomers represented by the general formula 1; copolymers of at least one monomer represented by the following general formula 1 with at least one monomer represented by the following general formula 2; or a mixture of these resins:

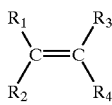

1

(in the formula 1, $R_1$, $R_2$ and $R_3$ may be the same or different from one another and each represents a member selected from the group consisting of a hydrogen atom, halogen atoms, cyano groups, cyanoalkyl groups having 1 to 8 carbon atoms, carboxyl groups, alkyl groups having 1 to 10 carbon atoms, alkyl ether groups having 2 to 15 carbon atoms, aminoalkyl groups having 1 to 10 carbon atoms, alkenyl groups having 2 to 12 carbon atoms, alkynyl groups having 2 to 12 carbon atoms, alkyl ester groups having 2 to 18 carbon atoms and alkoxy groups having 1 to 14 carbon atoms, with a proviso that if one of the groups $R_1$, $R_2$ and $R_3$ is a carboxyl group or an alkyl ester group having 2 to 18 carbon atoms, the other groups represent groups different from the former and $R_4$ represents a group represented by the following general formula 3 or 4);

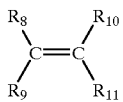

2

(in the formula 2, $R_8$, $R_9$, $R_{10}$ and $R_{11}$ are the same or different from each other and each represents a member selected from the group consisting of a hydrogen atom, halogen atoms, cyano groups, cyanoalkyl groups having 1 to 8 carbon atoms, carboxyl groups, alkyl groups having 1 to 10 carbon atoms, alkyl ether groups having 2 to 15 carbon atoms, aminoalkyl groups having 1 to 10 carbon atoms, aromatic groups having 6 to 32 carbon atoms and alkyl ester groups having 2 to 18 carbon atoms, provided that if one of the groups $R_8$, $R_9$, $R_{10}$ and $R_{11}$ is a carboxyl group or an alkyl ester group having 2 to 18 carbon atoms, the other groups represent groups different from the former);

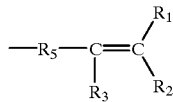

3

(in the formula 3, $R_1$ and $R_2$ are the same as those defined above in connection with the general formula 1, respectively and $R_5$ is a group represented by the following general formula 5, 6, 7 or 8);

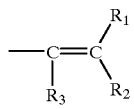

4

(in the formula 4, $R_1$, $R_2$ and $R_3$ are the same as those defined above in connection with the gneral formula 1, respectively);

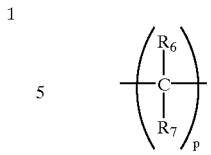

5

(in the formula 5, $R_6$ and $R_7$ are the same or different from one another and each represents a member selected from the group consisting of a hydrogen atom, halogen atoms, cyano groups, cyanoalkyl groups having 1 to 8 carbon atoms, aminoalkyl groups having 1 to 10 carbon atoms, aromatic groups having 6 to 32 carbon atoms and those represented by the foregoing general formula 3 or 4 and p is a numeral ranging from 1 to 12);

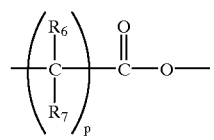

6

(in the formula 6, $R_6$ and $R_7$ and p are the same as those defined above in connection with the formula 5, respectively);

—Ar—  7

(in the formula 7, Ar represents an aromatic group having 6 to 32 carbon atoms);

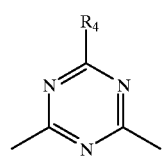

8

(in the formula 8, $R_4$ is the same as that defined above in connection with the general formula 3).

In the thermoplastic resin-coated ammonium polyphosphate according to the present invention, the foregoing thermoplastic resin is desirably used in an amount ranging from 1 to 40 parts by weight per 100 parts by weight of the core material.

In addition, if the thermoplastic resin is a homopolymer of a monomer represented by the foregoing general formula 1; a copolymer of these monomers; or a copolymer of a monomer represented by the general formula 1 with a monomer represented by the general formula 2, the monomer of Formula 1 is desirably a conjugated diene or non-conjugated diene monomer having two polymerizable double bonds.

As the core materials suitably used in the present invention, there may be listed, for instance, ammonium polyphosphate coated with or encapsulated in a thermosetting resin. Examples of such thermosetting resins are melamine resins, modified melamine resins, guanamine resins, epoxy resins, phenolic resins, urethane resins, urea resins and silicone resins, which may be used alone or in any combination of at least two of them.

In addition to the foregoing, examples of core materials usable in the present invention further include ammonium polyphosphate coated or modified with a melamine monomer; and surface-treated ammonium polyphosphate comprising ammonium polyphosphate and a surface-treating agent adhered to, adsorbed or absorbed on or added (adduct) to the surface of the ammonium polyphosphate. Examples of the surface-treating agents of this type include saturated or unsaturated fatty acids having 6 to 25 carbon atoms, metal salts of saturated or unsaturated fatty acids having 6 to 25 carbon atoms, silane coupling agents, titanate coupling agents, aluminate coupling agents, anionic surfactants, cationic surfactants, nonionic surfactants, amphoteric surfactants, fluorine atom-containing surfactants and mixture thereof, which may be used alone or in any combination of at least two of them.

In the thermoplastic resin-coated ammonium polyphosphate of the present invention, the ammonium polyphosphate desirably comprises phosphorus atoms in an amount ranging from 20 to 31% by weight.

In addition, the thermoplastic resin-coated ammonium polyphosphate of the present invention is desirably in the form of fine particles having an average particle size ranging from 0.1 to 50 µm and preferably 5 to 30 µm.

The process for producing the foregoing thermoplastic resin-coated ammonium polyphosphate according to the present invention is characterized in that a monomer represented by the foregoing Formula 1 and a monomer represented by the foregoing Formula 2 as an optional component are polymerized on the surface of a core material which comprises ammonium polyphosphate and, for instance, a thermosetting resin, a melamine monomer or a surface-treating agent, in the presence of a catalyst and in the presence or absence of a reaction solvent.

In the process of the present invention, the temperature of the polymerization reaction of the foregoing monomers desirably ranges from 20 to 150° C.

More specifically, in the process for producing the thermoplastic resin-coated ammonium polyphosphate according to the present invention, the polymerization reaction is desirably carried out by introducing a core material and, per 100 parts by weight of the core material, 0.1 to 40 parts by weight of a monomer of the general formula 1, 0.1 to 39.9 parts by weight of an optional monomer of the general formula 2, 0.1 to 10 parts by weight of a catalyst and a reaction solvent in a reactor, and then reacting these ingredients at a temperature ranging from 20 to 150° C. for 0.5 to 50 hours.

The flame retardant according to the present invention is characterized in that it comprises the thermoplastic resin-coated ammonium polyphosphate as set forth in claim 1 as an effective component.

BEST MODE FOR CARRYING OUT THE INVENTION

The thermoplastic resin-coated ammonium polyphosphate according to the present invention comprises a core material which comprises ammonium polyphosphate, and a thermosetting resin, a melamine monomer or a surface-treating agent; and a coating layer of a thermoplastic resin.

In the core material used in the present invention, the component other than ammonium polyphosphate (hereinafter sometimes referred to as "secondary component") serves to control the water-solubility of ammonium polyphosphate and/or to improve the adhesion of the polyphosphate to the coating layer of the thermoplastic resin. Therefore, it is sufficient that the secondary component is present at least on the surface of the core material. In other words, the secondary component is present on both the surface and interior of the polyphosphate or only on the surface of the polyphosphate.

In such a core material, the secondary component and ammonium polyphosphate may be present as a reaction product of these two components or a mixture thereof; a coated material obtained by coating the latter with the former or a material obtained by encapsulating the latter with the former; or a material obtained by adhering the former to the latter, or by adsorbing or absorbing the former on the latter; or in the form of an adduct thereof. In such a core material, ammonium polyphosphate can be made water-insoluble, hardly soluble in water, hydrophobic or water repellent, depending on the properties and the form of existence of the secondary component.

Examples of such core materials include mixed ammonium polyphosphate in which ammonium polyphosphate and a melamine monomer, a triazine derivative such as melamine phosphate are uniformly admixed together; coated ammonium polyphosphate in which ammonium polyphosphate is coated with or encapsulated in a triazine derivative; adsorbed ammonium polyphosphate which carries a triazine derivative adsorbed or absorbed on the surface thereof; hardly water-soluble ammonium polyphosphate which is a partial reaction product obtained by partially reacting the ammonium polyphosphate with a triazine derivative on the surface of the former; water-insoluble ammonium polyphosphate in which the polyphosphate is coated with or encapsulated in a thermosetting resin; and hydrophobic or water-repellent ammonium polyphosphate in which a surface-treating agent, a surfactant or a coupling agent is adsorbed or absorbed on the surface of the polyphosphate.

It is desirable that such a secondary component be in general used in an amount ranging from 2 to 40% by weight, preferably 3 to 20% by weight and more preferably 5 to 15% by weight on the basis of the total amount of the core material.

In this respect, ammonium polyphosphate as a principal component of the core material desirably contains phosphorus atoms in a content ranging from 20 to 31% by weight, preferably 25 to 30% by weight and more preferably 27 to 29% by weight (the phosphorus atom content of pure ammonium polyphosphate is about 32% by weight).

Examples of the thermosetting resins used for the preparation of the foregoing coated ammonium polyphosphate include melamine resins, modified melamine resins, guanamine resins, epoxy resins, phenolic resins, urethane resins, urea resins and silicone resins, which may be used alone or in combination.

Such coated ammonium polyphosphate may be prepared by a wet curing method wherein un-treated ammonium polyphosphate and an epoxy resin, urethane resin, phenolic resin, alkyd resin, urea resin, melamine resin, silicone resin or a mixture of at least two of them in the uncured state are introduced into a reactor and then cured with heating in water, an organic solvent or a mixed solvent thereof.

In addition to the foregoing method, the coated ammonium polyphosphate may likewise be prepared by any known method such as an in-situ polymerization method which comprises the steps of supplying, to a reactor, ammonium polyphosphate and a polymerizable monomer as polymerization components as well as a polymerization catalyst and then encapsulating ammonium polyphosphate with the polymer of the monomer component while establishing such polymerization conditions that a thermosetting resin is formed on the particle surface of the polyphosphate to thus uniformly cover the particles; an interfacial polymerization method which comprises the steps of separately dissolving two kinds of reactive components in respective two kinds of solvents which are not miscible with one another and bringing the resulting two solutions into contact with one another to thus form film-like thermosetting resin at the interface formed between these two liquid phases; a coacervation method which makes use of such a phenomenon (liquid-liquid phase separation) that in a resin/good solvent/non-solvent system, a phase rich in the thermosetting resin is separated from the solvent system; a spray-drying method which comprises the steps of spraying a stock solution of a thermosetting resin on fine particles of ammonium polyphosphate to thus encapsulate the polyphosphate particles with the thermosetting resin, bringing the encapsulated particles into contact with hot air to thus cure the resin and to simultaneously dry the particles through evaporation of the volatile components; and a hybridization method which comprises the steps of applying a mechanical and/or thermal energy mainly comprising an impact force onto raw resin particles and then fixing the particles to the surface of ammonium polyphosphate particles or encapsulating the polyphosphate particles within the resin particles.

In this regard, the surface-treating agent is suitably a compound which can not only impart hydrophobicity and water-repellency to ammonium polyphosphate particles, but also introduce functional groups into the surface of the ammonium polyphosphate particles to thus make stronger the interaction between the coating film and ammonium polyphosphate as the principal component of the core material and to impart high adhesion thereto in the subsequent process for thermoplastic resin-coating.

Examples of such surface-treating agents include higher fatty acids, coupling agents and surfactants.

More specifically, examples of higher fatty acids are lauric acid, myristic acid, palmitic acid, stearic acid, oleic acid and behenic acid.

Examples of preferred coupling agents are those listed below:

Silane coupling agents represented by the general formula: $X_q SiY_{4-q}$ (wherein q is a numeral ranging from 1 to 2; X may be the same or different when a plurality of Xs are present and each represents a hydrolyzable group such as $CH_3O-$, $C_2H_5O-$, $CH_3OCH_2CH_2O-$ or $Cl-$; and Y may be the same or different when a plurality of Ys are present and each represents an alkyl group having 1 to 20, preferably 1 to 12 carbon atoms, a vinyl group, an aminoalkyl group having 3 to 6 carbon atoms, a glycidoxy alkyl group having 5 to 9 carbon atoms, a methacryloxy alkyl group having 5 to 10 carbon atoms, a vinylbenzyl group-conatining group, a chloroalkyl group having 2 to 6 carbon atoms or an epoxy cyclohexyl ethyl group);

Four- to six-coordinated titanate type coupling agents such as isopropyl triisostearoyl titanate, isopropyl tris (dioctylpyrophosphate) titanate, isopropyl tri(N-aminoethylaminoethyl) titanate, tetraoctyl bis(di-tridecylphosphite) titanate, tetra(2,2-diallyloxymethyl-1-butyl)-bis(di-tridecyl) phosphite titanate, bis (dioctylpyrophosphate) oxyacetate titanate, bis (dioctylpyrophosphate) ethylene titanate, isopropyl trioctanoyl titanate, isopropyl dimethacryl isostearoyl titanate, isopropyl tridodecyl benzenesulfonyl titanate, isopropyl isostearoyl diacryl titanate, isopropyl tri (dioctylphosphate) titanate, isopropyl tricumylphenyl titanate and tetraisopropyl bis(dioctylphosphite) titanate;

Aluminate type coupling agents such as acetoalkoxy aluminum diisopropylate, alkoxy aluminum diisopropylate and alkoxy aluminum acetylacetonate;

Zircoaluminate type coupling agents such as alkoxy zircoaluminum diisopropylate and alkoxy zircoaluminum acetylacetonate; and Phosphate type coupling agents.

In addition, surfactants may be any conventionally known ones including, for instance, anionic surfactants, cationic surfactants, nonionic surfactants, amphoteric surfactants and fluorine atom-containing surfactants.

Examples of anionic surfactants include saturated fatty acid salts having 10 to 32 and preferably 12 to 22 carbon atoms, for instance, higher carboxylic acid salts such as lauric acid salts, myristic acid salts, palmitic acid salts, stearic acid salts and oleic acid salts; condensates of higher fatty acids with amino acids such as N-acyl-N-methylglycine, N-acyl-N-methyl- β-alanine and N-acyl-glutamic acid, and salts thereof; alkyl ether carboxylic acid salts; acylated peptides; alkylbenzenesulfonic acid salts; alkylnaphthalenesulfonates; naphthalenesulfonatesformaldehyde polycondensates; dialkylsulfosuccinates; alkylsulfoacetates; α-olefin sulfonates; N-acylmethyl taurine; Turkey red oil; higher alcohol sulfates; secondary higher alcohol sulfates; alkyl ether sulfates; secondary higher alcohol ethoxysulfates; polyoxyethylene alkylphenyl ether sulfates; monoglysulfate; sulfates of fatty acid alkylolamides; alkyl ether phosphoric acid monoester salts; alkyl ether phosphoric acid diester salts; alkyl ether phosphoric acid triesters; alkyl phosphoric acid monoester salts; alkyl phosphoric acid diester salts; and alkyl phosphoric acid triesters.

Examples of cationic surfactants are higher aliphatic amine salts such as those obtained by neutralizing primary, secondary and tertiary higher alkylamines having 12 to 54 carbon atoms with inorganic acids such as hydrochloric acid and sulfuric acid or organic acids such as acetic acid, lactic acid and citric acid; aliphatic quaternary ammonium salts having 12 to 40 carbon atoms; benzalkonium salts; benzethonium chloride; alkyl pyridinium salts; and imidazolinium salts and examples of amphoteric surfactants include alkyl dimethyl betaines; aminocarboxylic acid salts; imidazolinium betaine; and lecithin.

In addition, examples of nonionic surfactans are polyoxyethylene alkyl ethers prepared by addition-polymerization of aliphatic primary alcohols each having 12 to 22 carbon atoms and ethylene oxide; polyoxyethylene secondary alcohol ethers; polyoxyethylene alkylphenyl ethers; polyoxyethylene sterolethers; polyoxyethylene lanolin derivatives; polyethylene alkyl phenol ether formaldehyde condensates; polyoxyethylene polyoxypropylene block copolymers; polyoxyethylene polyoxypropylene alkyl ether; polyoxyethylene glycerin fatty acid esters; polyoxyethylene castor oil and hydrogenerated castor oil; polyoxyethylene sorbitan fatty acid esters; polyoxyethylene sorbitol fatty acid esters; polyethylene glycol fatty acid esters; fatty acid monoglycerides; polyglycerin fatty acid esters; sorbitan fatty acid esters; propylene glycol fatty acid esters; sucrose fatty acid esters; fatty acid alkanolamides; polyoxyethylene fatty acid amides; polyoxyethylene alkylamines; and alkylamine oxides.

Moreover, fluorine atom-containing surfactants herein used are those having, as hydrophobic groups, fluorocarbon or perfluorocarbon groups. Examples of such fluorine atom-containing surfactants include fluoroalkyl carboxylic acids whose alkyl group has 2 to 10 carbon atoms, disodium N-perfluorooctanesulfonyl glutamic acid, sodium 3-(fluoroalkyl($C_6$ to $C_{11}$)oxy)-1-alkyl($C_3$ to $C_5$)-sulfonate, sodium 3-(ω-fluoroalkanoyl($C_6$ to $C_8$)-N-ethylamino)-1-propanesulfonate, N-[3-(perfluorooctanesulfonamido)

propyl]N,N-dimethyl-N carboxymethylene ammonium betaine, fluoroalkyl($C_{11}$ to $C_{20}$)carboxylic acids, perfluoroalkyl($C_7$ to $C_{13}$)carboxylic acids, perfluorooctanesulfonic diethanolamide, perfluoroalkyl($C_4$ to $C_{12}$)sulfonic acid salts, N-propyl-N-(2-hydroxyethyl) perfluorooctanesulfonamides, perfluoroalkyl($C_6$ to $C_{10}$) sulfonamidopropyl trimethyl ammonium salts, perfluoroalkyl($C_6$ to $C_{10}$)-N-ethylsulfonyl glycine salts, phosphoric acid bis(Nperfluorooctylsulfonyl-N-ethylaminoethyl) and monoperfluoroalkyl(C6 to $C_{16}$)ethyl phosphoric acid esters.

In the present invention, the foregoing surface-treating agents may be used in combination in any amount. In this regard, the surface-treating methods usable herein, which make use of these surface-treating agents, may be known ones such as a wet method which comprises the steps of preparing a solution of a surface-treating agent by diluting it with, for instance, water, an aqueous acetic acid solution or water-alcohol mixed solvent and then immersing a subject to be treated in the resulting solution; and a dry method which comprises the step of adding the surface-treating agent or a solution thereof to a subject with stirring by, for instance, spraying. In addition, if a coupling agent is used as the surface-treating agent, it is possible to use a primer method which makes use of a primer prepared by homo-polymerizing the coupling agent or reacting it with another prepolymer.

As the core material used in the present invention may be those prepared by the method described above and those commercially available and examples of such commercially available core materials are Hostaflam AP-462 (trade name of a product manufactured by Hoechst Company), Sumisafe-PM (trade name of a product manufactured by Sumitomo Chemical Co., Ltd.), TERRAJU-M30 (trade name of a product manufactured by Chisso Corporation), TERRAJU-M40 (trade name of a product manufactured by Chisso Corporation), TERRAJU-C30 (trade name of a product manufactured by Chisso Corporation), TERRAJU-C40 (trade name of a product manufactured by Chisso Corporation), TERRAJU-C60 (trade name of a product manufactured by Chisso Corporation), TERRAJU-C70 (trade name of a product manufactured by Chisso Corporation) and TERRAJU-C80 (trade name of a product manufactured by Chisso Corporation).

In the present invention, the thermoplastic resin for covering such a core material is desirably those having good adhesion to the surface of the core material and capable of forming a uniform coating film thereon.

Moreover, the method for applying the coating film comprising these thermoplastic resin to the surface of the core material may likewise appropriately be selected depending on the factors such as the kinds of monomers for the production of the resins and the kinds of resins prepared and, for instance, it is possible to properly employ the encapsulation technique which is used for the preparation of core materials provided thereon with a coated film of a thermosetting resin.

The thermoplastic resins used for covering the core material in the present invention particularly preferably include, for instance, homopolymers of specific monomers (hereinafter also referred to as "first monomer") having 2 to 5 double bonds capable of undergoing polymerization, in each molecule; copolymers of at least two of the first monomers; and copolymers of at least one of the first monomer with at least one monomer (hereinafter also referred to as "second monomer") having one double bond capable of undergoing polymerization, in the molecule. These polymers and copolymers may be used alone or in any combination of at least two of them, as the thermoplastic resin.

The first monomer having 2 to 5 double bonds capable of undergoing polymerization in the molecule may be represented by the following general formula 1:

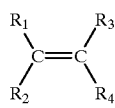

In the formula 1, $R_1$, $R_2$ and $R_3$ may be the same or different from one another and each represents a member selected from the group consisting of a hydrogen atom, halogen atoms, cyano groups, cyanoalkyl groups having 1 to 8, preferably 1 to 6 carbon atoms, carboxyl groups, alkyl groups having 1 to 10, preferably 1 to 6 carbon atoms, alkyl ether groups having 2 to 15, preferably 2 to 10 carbon atoms, aminoalkyl groups having 1 to 10, preferably 2 to 6 carbon atoms, alkenyl groups having 2 to 12, preferably 2 to 8 carbon atoms, alkynyl groups having 2 to 12, preferably 2 to 8 carbon atoms, alkyl ester groups having 2 to 18, preferably 2 to 10 carbon atoms and alkoxy groups having 1 to 14, preferably 1 to 8 carbon atoms, with the proviso that if one of the groups $R_1$, $R_2$ and $R_3$ is a carboxyl group or an alkyl ester group, the other groups represent groups different from the former.

Examples of the foregoing halogen atoms are fluorine, chlorine, bromine and iodine atoms; and Examples of the cyanoalkyl groups include those represented by the general formula:

(wherein n is an integer ranging from 1 to 8) and specific examples thereof include linear cyanoalkyl groups such as cyanomethyl group, cyanoethyl group, cyanopropyl group, cyanobutyl group, cyanopentyl group and cyanohexyl group; and alkyl-substituted groups of these linear cyanoalkyl groups such as 1-methylcyanoethyl group, 2-methylcyanoethyl group, 1,1-dimethylcyanoethyl group, 1,2-dimethylcyanoethyl group, 2,2-dimethylcyanoethyl group, 1,2-dimethylcyanopropyl group, 1,3-dimethylcyanopropyl group, 1-ethylcyanoethyl group, 2-ethylcyanoethyl group, 1,1-diethylcyanoethyl group, 1,2-diethylcyanoethyl group, 2,2diethylcyanoethyl group, 1,2-diethylcyanopropyl group and 1,3-diethylcyanopropyl group;

Examples of the alkyl groups are those represented by the general formula:

(wherein n is an integer ranging from 1 to 10) such as methyl group, ethyl group, propyl group, isopropyl group, 2-methylethyl group, butyl group, isobutyl group, 3-methylpropyl group, 3-ethylpropyl group, 2-methylbutyl group, 3-methylbutyl group, 2-methylpentyl group, 3-methylhexyl group, 4-methylhexyl group, pentyl group and hexyl group;

Examples of the alkyl ether groups are those represented by the general formula:

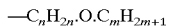

(wherein n and m each is an integer ranging from 1 to 14, provided that the sum of n and m falls within the range of from 2 to 15) such as methoxymethyl group, methoxyethyl group, methoxypropyl group, methoxypentyl group, methoxyhexyl group, ethoxymethyl group, ethoxyethyl group, ethoxypropyl group, ethoxypentyl group and ethoxyhexyl group;

Examples of the aminoalkyl groups include those represented by the general formula:

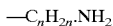
—$C_nH_{2n}$.NH$_2$ (wherein n is an integer ranging from 1 to 10) such as aminomethyl group, aminoethyl group, aminopropyl group, aminoisopropyl group, aminobutyl group, aminoisobutyl group, aminopentyl group and aminohexyl group;

Examples of the alkenyl groups are those represented by the general formula:

—$C_nH_{2n-1}$ (wherein n is an integer ranging from 2 to 8) such as vinyl group, allyl group, propenyl group, butenyl group, pentenyl group, hexenyl group, heptenyl group, octenyl group and alkyl-substituted derivatives thereof;

Examples of the alkynyl groups are those represented by the general formula:

—$C_nH_{2n-2}$ (wherein n is an integer ranging from 2 to 12) such as ethynyl group, propynyl group, butynyl group, pentynyl group, hexynyl group, peptynyl group, octynyl group and alkyl-substituted derivatives thereof; and Examples of the alkyl ester groups are those represented by the general formula:

—C(O)OC$_n$H$_{2n+1}$ (wherein n is an integer ranging from 2 to 10) such as methyl ester group, ethyl ester group, propyl ester group, butyl ester group, pentyl ester group, hexyl ester group and alkyl-substituted derivatives thereof.

In addition, the group $R_4$ represents a group represented by the following general formula 3 or 4:

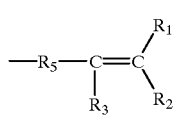

3

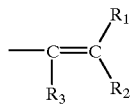

4

In the formula 3, $R_1$ and $R_2$ are the same as those defined above in connection with the general formula 1, respectively and in the formula 4, $R_1$, $R_2$ and $R_3$ are the same as those defined above in connection with the gneral formula 1, respectively.

Moreover, the group $R_5$ appearing in Formula 3 is a group represented by the following general formula 5, 6, 7 or 8:

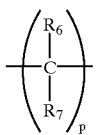

5

(in the formula 5, $R_6$ and $R_7$ are the same or different from one another and each represents a member selected from the group consisting of a hydrogen atom, halogen atoms, cyano groups, cyanoalkyl groups having 1 to 8, preferably 1 to 6 carbon atoms, aminoalkyl groups having 1 to 10, preferably 2 to 6 carbon atoms, aromatic (aryl) groups having 6 to 32, preferably 6 to 12 carbon atoms and those represented by the foregoing general formula 3 or 4 and p is a numeral ranging from 1 to 12 and preferably 1 to 6);

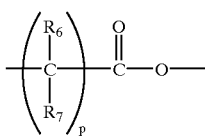

6

(in the formula 6, $R_6$ and $R_7$ and p are the same as those defined above in connection with the formula 5, respectively);

—Ar—

7

(in the formula 7, Ar represents an aromatic group having 6 to 32, preferably 6 to 12 carbon atoms); and

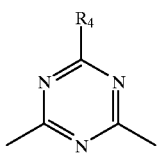

8

(in the formula 8, $R_4$ is the same as that defined above in connection with the general formula 3).

In the foregoing Formula 5, specific examples of the halogen atom, cyanolkyl group, alkyl group, alkyl ether group, aminoalkyl group, alkenyl group, alkynyl group and alkyl ester group may be the same as those listed above in connection with the general formula 1. Moreover, in the foregoing Formulas 1 and 3 to 8, the groups represented by $R_1$ to $R_8$ are selected in such a manner that the total number of double bonds capable of undergoing polymerization present in each monomer molecule is equal to 2 to 5 and preferably 2 to 3.

In the present invention, such a first monomer is particularly preferably a conjugated diene monomer or a non-conjugated diene monomer having two polymerizable double bonds in the molecule.

Specific examples of the first monomers thus detailed above are those listed below:

1,2-divinyl benzene, 1,3-divinyl benzene, 1,4-divinyl benzene, 1,2-diallyl phthalate, 1,2-diallyl phthalate, 1,4-diallyl phthalate, divinyl ether, allyl vinyl ether, propenyl vinyl ether, allyl-α-methyl vinyl ether, butadiene, chloroprene, fluoroprene, cyanoprene, bromoprene, 1,4-pentadiene, 1,5-hexadiene, 1,6-heptadiene, 1,7-octadiene, 1,8-nonadiene, 1,9-decadiene, 1,10-undecadiene, 1,11- dodecadiene, 1,12-tridecadiene, 1,13-tetradecadiene, 1,17-octadecadiene, 1,21-docosadiene, allene, allene derivatives, 2,5-dimethyl-1,5-hexadiene, cis-1,5,9-decatriene, trans-1,3,7-octatriene, 1-vinyl-3-methylene cyclopentane, 2,5-diphenyl-1,5-hexadiene, 2-phenyl-1,5-hexadiene, 3-methyl-1,5-hexadiene, 3-phenyl-1,5-hexadiene, 3-methyl-4-phenyl-1,5-hexadiene and 3-vinyl-1,5-hexadiene;

2,6-diphenyl-1,6-heptadiene, 2,7-diphenyl-1,7-octadiene, 3-phenyl-1,5-heptadiene, 2,6-dicarbethoxy-1,6-heptadiene, 2,6-dicarboxy-1,6-heptadiene, 2,6-dicyano-1,6-heptadiene, 4,4-dicarbethoxy-1,6-heptadiene, 4-acetyl-4-carbethoxy-1,6-heptadiene, 4-carboxy-1,6-heptadiene, 4-acetyl-1,6-heptadiene, 4,4-diacetyl-1,6-heptadiene, 4-cyano-4-carbethoxy-1,6-heptadiene, 4-cyano-4-carboxy-1,6-heptadiene, 4-cyano-1,6-heptadiene, 2,6-dichloro-4,4-dicarbethoxy-1,6-heptadiene, 2,6-dichloro-3-carbethoxy-1,6-heptadiene, 4-allyl-4-hydroxy- 1,6-heptadiene, 4-allyl-4-acetoxy-1,6-heptadiene, trans-1,2-divinyl cyclobutane, cis-1,2-divinyl cyclobutane, trans-1,2-dimethyl-1,2-divinyl cyclobutane, trans-1-isopropenyl-2-vinyl cyclobutane and trans-1,2-diisopropenyl cyclobutane;

cis-1,2-divinyl cyclopentane, cis-1,3-divinyl cyclopentane, trans-1,3-divinyl cyclopentane, cis-1,2-divinyl cyclohexane, trans-1,2-divinyl cyclohexane, cis-1,3-divinyl cyclohexane, trans-1,3-divinyl cyclohexane, trivinyl cyclohexane, 1,2,4-trimethylene cyclohexane, 1,3,5-trimethylene cyclohexane, 1,3,5,7-tetramethylene cyclooctane, 1,4-dimethylene cyclohexane, 1-methylene-4-vinyl cyclohexane, divinyl ketone, divinyl acetylene, triallyl isocyanurate, triallyl cyanurate, triacryl formal, trimethallyl isocyanurate, diglycidyl bisphenol A diacrylate, dipentaerythritol monohydroxyacrylate, trimethylolpropane triacrylate, neopentyl glycol hydroxypivalic acid ester diacrylate, 1,4-butanediol diacrylate, 2-propenoic acid [2-[1,1-dimethyl-2-[(1-oxo-2-propenyl)oxy]ethyl]-5-ethyl-1,3-dioxan-5-yl]methyl ester, pentaerythritol triacrylate, trimethacrylic acid trimethylolpropane, dimethacrylic acid ethylene glycol, dimethacrylic acid triethylene glycol, dimethacrylic acid tetraethylene glycol, dimethacrylic acid 1,3-butylene glycol, allyl methacrylate, N,N'-methylenebis(acrylamide), triallyl trimellitate, 3,9-divinyl-2,4,8,10-tetraoxaspiro[5,5]undecane. These first monomers may be used alone or in any combination.

The secondary monomer optionally used in combination with the first monomer in the preparation of the thermoplastic resin suitably used as a coating material for the core material in the present invention is one carrying one polymerizable double bond in the molecule and may be represented by the following general formula 2:

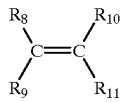

2

In the formula 2, $R_8$, $R_9$, $R_{10}$ and $R_{11}$ are the same or different from each other and each represents a member selected from the group consisting of a hydrogen atom, halogen atoms, cyano groups, cyanoalkyl groups having 1 to 8, preferably 1 to 6 carbon atoms, carboxyl groups, alkyl groups having 1 to 10, preferably 1 to 6 carbon atoms, alkyl ether groups having 2 to 15, preferably 2 to 10 carbon atoms, aminoalkyl groups having 1 to 10, preferably 2 to 6 carbon atoms, aromatic (aryl) groups having 6 to 32, preferably 6 to 12 carbon atoms and alkyl ester groups having 2 to 18, preferably 2 to 10 carbon atoms, provided that if one of the groups $R_8$, $R_9$, $R_{10}$ and $R_{11}$ is a carboxyl group or an alkyl ester group, the other groups represent groups different from the former).

In the foregoing Formula 5, specific examples of the halogen atom, cyanoalkyl group, alkyl group, alkyl ether group, aminoalkyl group and alkyl ester group may be the same as those listed above in connection with the general formula 1 and examples of aromatic groups are phenyl group, phenyl groups substituted with 1 to 5 alkyl groups, biphenyl group and naphthyl group.

In addition, specific examples of such monomers each having one polymerizable double bond in the molecule include those listed below:

Ethylene, propylene, 1-butene, isobutylene, 3-methyl-1-butene, 4-methyl-1-pentene, 1-hexene, 1-octene and 1-decene;

Styrene, α-methylstyrene, vinyltoluene, chlorostyrene, cyanostyrene, aminostyrene, hydroxystyrene, vinylnaphthalene, vinylanthracene, 2-vinylphenanthrene and 3-vinylphenanthrene;

Acrylonitrile, methacrylonitrile, acrylic acid, methacrylic acid, acrylic acid esters, methacrylic acid esters, cyclohexyl methacrylate, benzyl methacrylate, 2-hydroxyethyl methacrylate, 2-hydroxypropyl methacrylate, methylaminoethyl methacrylate, diethylaminoethyl methacrylate, glycidyl methacrylate, tetrahydrofurfuryl methacrylate, α-cyanoacrylic acid ester, α-halogenoacrylic acid ester, acrylamide, methacrylamide and diacetone acrylamide;

Allyl chloride, allyl alcohol, allyl amine, allyl acetone, allyl aldehyde, allyl ester, allyl methyl ether, allyl ethyl ether, allyl carbamide, allyl glycerin, allyl acetic acid, allyl thioalcohol, allyl thiocarbamide, allyl thiocarboimide, allyl thiourea and allyl urea;

Vinyl chloride, vinylidene chloride, vinyl bromide, vinyl fluoride, vinylidene fluoride, fluorostyrene, vinyl acetate, vinyl laurate and vinyl salicylate;

Methyl vinyl ether, ethyl vinyl ether, n-propyl vinyl ether, isopropyl vinyl ether, n-butyl vinyl ether, isobutyl vinyl ether, n-hexyl vinyl ether, n-octyl vinyl ether, phenyl vinyl ether, o-cresyl vinyl ether, p-cresyl vinyl ether, p-chlorophenyl vinyl ether, α-naphthyl vinyl ether and β-naphthyl vinyl ether; and 1-Buten-3-on, acrylophenone, 2-vinylpyridine, 4-vinylpyridine and 2-methyl-5-vinylpyridine. These secondary monomers may be used alone or in any combination of at least two of them.

The polymerization or copolymerization reaction of the first monomer and the optional secondary monomer can be carried out using a polymerization initiator used in the usual radical polymerization reaction. The polymer or copolymer prepared from the monomer including the first monomer is a two- or three-dimensionally cross-linked thermoplastic resin and it is hardly soluble or almost insoluble in the usual organic solvents due to the cross-linked structure. For this reason, the ammonium polyphosphate particles coated with this thermoplastic resin is excellent in resistance to organic solvents.

The ammonioum polyphosphate obtained by coating the core material described above with a thermoplastic resin having such a structure can conveniently be prepared by the following process according to the present invention.

In other words, according to the process of the present invention, the thermoplastic resin-coated ammonium polyphosphate is produced by subjecting a monomer represented by the foregoing general formula 1 and a secondary monomer represented by the general formula 2 as an optional component to a polymerization reaction, on the surface of the core material defined above, in the presence of polymerization catalyst, with or without using a reaction solvent.

More specifically, there are first added, to a reactor, preferably a reactor provided with heating and stirring means or heating and kneading means, the core material, 0.1 to 40 parts by weight, preferably 2 to 20 parts by weight of the first monomer, 0.1 to 39.9 parts by weight, preferably 2 to 10 parts by weight of the optional secondary monomer and 0.1 to 10 parts by weight, preferably 0.5 to 5 parts by weight of a polymerization initiator, per 100 parts by weight of the core material, followed by admixing these ingredients.

At this stage, a reaction solvent may be used in an amount ranging from 10 to 500 parts by weight and examples of such reaction solvents are water or organic solvents inert to each monomer, which may be used alone or in combination.

Examples of the polymerization initiators usable in the polymerization reaction include organic peroxides such as benzoyl peroxide, acetyl peroxide, t-butylhydroxy peroxide, cumene hydroperoxide, di-t-butyl peroxide, lauroyl peroxide, dimethyl α, α'-azodiisobutyrate, succinic acid peroxide, dicumene peroxide and dichlorobenzoyl peroxide; inorganic peroxides such as potassium persulfate, ammonium persulfate, hydrogen peroxide and sodium perborate; azo compounds such as α, α'-azodiisobutyronitrile, azodicyclohexylcarbonitrile, phenylazotriphenyl methane. All of these peroxides may be commercially available ones.

Then the mixture in the reactor is heated to a temperature ranging from 20 to 150° C., preferably 50 to 100° C. with stirring and the reaction is continued over a time sufficient for the completion of the polymerization reaction, for instance, 0.5 to 50 hours to thus form a coating layer of a cross-linked polymer on the surface of the core material and to thus give the thermoplastic resin-coated ammonium polyphosphate according to the present invention.

In the thermoplastic resin-coated ammonium polyphosphate of the present invention as has been described above, the amount of the thermoplastic resin coating layer ranges from 1 to 40 parts by weight and preferably 5 to 20 parts by weight per 100 parts by weight of the core material.

In addition, the thermoplastic resin-coated ammonium polyphosphate of the present invention desirably has an average particle size ranging from 0.1 to 50 μm and preferably 5 to 30 μm from the viewpoint of, for instance, the dispersibility in a resin composition used as a flame retadant.

A flame retardant containing, as an effective component, the thermoplastic resin-coated ammonium polyphosphate of the present invention, i.e., the flame retardant according to the present invention may comprise only the thermoplastic resin-coated ammonium polyphosphate; or a combination thereof with other known flame retardants, for instance, inorganic flame retardants such as phosphoric acid esters, condensed phosphoric acid esters, amorphous phosphorus, coated amorphous phosphorus, magnesium hydroxide, aluminum hydroxide, phosphoric acid salts and boric acid salts; and other components capable of improving the flame retardancy of the flame retardant of the invention if the former is used in combination with the latter, for instance, polyhydric alcohols such as pentaerythritol and tris(2-hydroxyethyl)isocyanurate, and/or nitrogen atom-containing compounds such as melamine, melamine cyanurate, melamine resins, polyamides and polyimides.

In the flame retardant according to the present invention, the thermoplastic resin-coated ammonium polyphosphate included therein as an effective component is excellent in the water resistance, resistance to organic solvents and chemical resistance (resistance to acids and rsistance to alkalis) and also has a high affinity for thermoplastic resins. Therefore, the flame retardant is quite suitable for the incorporation, in particular, into compositions for obtaining resin molded articles.

EFFECTS OF THE INVENTION

The thermoplastic resin-coated ammonium polyphosphate according to the present invention is excellent in water resistance and resistance to organic solvents or chemical resistance such as resistance to acids and resistance to alkalis and if it is incorporated into a thermosetting resin or thermoplastic resin-based molding material as a component for the flame retardant added thereto, it can provide a molded article which does not show any substantial reduction in the mechanical strength and has a high effect of controlling, for instance, hygroscopicity. Therefore, the thermoplastic resin-coated ammonium polyphosphate according to the present invention can be suitably used as a flame retardant component for, for instance, electric and eletronic parts, materials for motorcars and construction materials.

EXAMPLES

The present invention will hereinafter be described in more detail with reference to the following Examples and Comparative Examples, but the present invention is not restricted to these specific Examples at all. Moreover, in these Examples and Comparative Examples, the quality evaluation was carried out according to the methods described below.

(1) Method for Evaluation of Water-Solubility

The amount of the water-soluble components present in the product was determined as follows. Each of the products (10 g) prepared in Examples and Comparative Examples was suspended in 90 g of pure water to give a suspension. After shaking the suspension at a temperature of 25° C. for 24 hours, it was centrifuged and then the resulting supernatant was filtered through filter paper of 0.45 μm. A predetermined amount of the resulting filtrate was taken in a weighing bottle, followed by evaporation to dryness thereof in a dryer and determination of the water-solubility of the sample according to the following formula 1. In this respect, the lower the numerical value obtained, the higher the water-resistance of the sample.

$$\text{Water-Solubility (\%)} = \frac{W(R) \times W(PW) \times 100}{W(S) \times (W(F) - W(R))}$$

wherein W(R) means the weight of the residue remaining after the evaporation to dryness; W(PW) represents the weight of pure water; W(S) represents the weight of the sample; and W(F) means the weight of the filtrate.

(2) Method for the Evaluation of Resistance to Acids

Each of the products (10 g) prepared in Examples and Comparative Examples was suspended in 90 g of a 0.1N hydrochloric acid solution to prepare a 10% by weight suspension. After shaking the suspension at a temperature of 25° C. for one hour, it was centrifuged and then the resulting supernatant was filtered through filter paper of 0.45 μm. A predetermined amount of the filtrate was dispensed in a weighing bottle, followed by evaporation to dryness thereof in a dryer and determination of the solubility of each sample in the acid solution according to the relation similar to the foregoing formula 1. In this respect, the lower the numerical value obtained, the higher the resistance to acids of the sample.

(3) Method for the Evaluation of Resistance to Alkalis and Ions

After shaking 90 g of a 0.1N sodium hydroxide or sodium chloride aqueous solution at a temperature of 25° C. for one hour, about 5 g of the aqueous solution was taken in a weighing bottle, followed by evaporation to dryness to thus determine the blank value.

Then each of the products (10 g) prepared in Examples and Comparative Examples was suspended in 90 g of a 0.1N sodium hydroxide or sodium chloride aqueous solution to prepare a 10% by weight suspension. After shaking the suspension at a temperature of 25° C. for one hour, it was centrifuged and then the resulting supernatant was filtered through filter paper of 0.45 μm. About 5 g of the filtrate was correctly dispensed in a weighing bottle, followed by evaporation to dryness thereof in a dryer to thus determine the solubility of the sample in the aqueous alkali or salt solution according to the following formula 2. In this respect, the lower the numerical value obtained, the higher the resistance to alkalis of the sample.

$$\text{Solubility } (\%) = \frac{(W(R) - Vb) \times W(HCl) \times 100}{W(S) \times \{W(F) - (W(R) - Vb)\}}$$

wherein W(R), W(S) and W(F) are the same as those defined above in connection with the foregoing formula 1, Vb represents the blank value and W(HCl) represents the weight of HCl.

(4) Method for the Evaluation of Resistance to Organic Solvents

Each of the products obtained in Examples and Comparative Examples (10 g each) was suspended in 90 g of toluene to prepare a 10% by weight suspension. After shaking the suspension at a temperature of 25° C. for one hour, it was centrifuged and then the resulting supernatant was filtered through filter paper of 0.45 μm. About 5 g of the filtrate was correctly dispensed in a weighing bottle, followed by evaporation to dryness thereof in a dryer to thus determine the solubility of the sample in the oganic solvent according to the relation similar to the foregoing formula 1. In this respect, the lower the numerical value obtained, the higher the resistance to organic solvents of the sample.

(5) Method for Evaluating Water Resistance and Flame Retardancy of Flame Retardant Resin-Molded Article There were preliminarily admixed sufficiently 100 parts by weight of a bisphenol A type epoxy resin Epicote 828 (trade name of a product manufactured by Yuka Shell Epoxy Co., Ltd.) and Epomate LX-IN (trade name of a product manufactured by Yuka Shell Epoxy Co., Ltd.) as a curing agent. Then each (40 parts by weight) of the products obtained in Examples and Comparative Examples was added to the mixture, followed by additional mixing. The resulting resin composition was poured into a mold having a size of 100 mm long×100 mm wide so that the thickness of the composition was equal to about 3 mm, followed by degassing under reduced pressure, then curing the composition by allowing it to stand at 50° C. for 24 hours to thus give a flat plate. Specimens for water resistance test (40 mm long×40 mm wide) and for flame retardancy test (100 mm long×6 mm wide) were cut from the resulting plate using a band saw.

The water resistance was determined by allowing each specimen to stand at 80° C. for 7 days while immersing it in 200 g of pure water and then determination of the electric conductivity ($10^{-3}\Omega^{-1}m^{-1}$) of the immersion liquid and calculation of the difference between the measured value and the blank value, which was used as the indication for the water resistance. The release of the hydrolyzate originated from ammonium polyphosphate causes an increase of the electric conductivity.

The flame retardancy was evaluated according to the method specified in JIS K7201 (Combustion test methods for polymeric materials based on the oxygen index).

(6) Impact Resistance Test

This was evaluated according to the method defined in JIS K7110 (Izod impact test for rigid plastics). In this respect, the specimen used was prepared as follows:

To a Henschel (trade name) mixer, there were added 100 parts by weight of a polystyrene resin (Daicel Styrol R63) and 30 parts by weight of ammonium polyphosphate obtained in each of Examples and Comparative Examples, followed by stirring and mixing for 3 minutes, kneading the mixture at a melting and kneading temperature of 210° C. in a twin-screw extruder (PCM-30 manufactured by Ikegai Corporation), extrusion thereof in the form of strands and cutting the strands into pellets. After drying the pellets at 80° C. for 8 hours, the pellets were molded into a specimen having a size of 127 mm long×12.7 mm wide×3 mm thick at a molding temperature of 210° C. in an injection molding machine (N40B-II manufactured by The Japan Steel Works, Ltd.). The both ends (32 mm each) were cut off from the molded article and a notch having a depth of 2.54 mm and an R (curvature radius) at the tip of 0.25 mm was formed on the center of the central part of the article which was used as a test piece.

The core materials used in Examples and Comparative Examples are expressed by the following abbreviations:

APP-1: Melamine-coated ammonium polyphosphate prepared in the following Reference Example 1;

APP-2: Formaldehyde-modified melamine-coated ammonium polyphosphate prepared in the following Reference Example 2;

APP-3: Hostaflam AP462 (manufactured by Hoechst Company); ammonium polyphosphate covered with melamineformaldehyde polycondensate.

Reference Example 1

To a 5-liter volume kneader pre-heated to a temperature ranging from 270 to 300° C., there were added 1900 parts by weight of ammonium polyphosphate having the crystalline form II and an average particle size of about 15 μm and 100 parts by weight of melamine (reagent grade) and the resulting mixture was maintained at a temperature ranging from 260 to 300° C. for 6 to 7 hours with stirring. After cooling, melamine-coated ammonium polyphosphate (APP-1) was obtained as a core material in an amount of about 2000 parts by weight. The average particle size of the melamine-coated ammonium polyphosphate was found to be about 17 μm. The coated ammonium polyphosphate was observed with an electron microscope and as a result, it was confirmed that the surface of ammonium polyphosphate particles were approximately uniformly coated with melamine.

Reference Example 2

To a 5-liter volume reaction vessel equipped with a heater, a stirrer and a refluxing device, there were added 1000 parts by weight of the melamine-coated ammonium polyphosphate prepared in Reference Example 1, 116 parts by weight of a formalin solution having a concentration of 37% by weight and 2000 parts by weight of an aqueous methanol solution having a concentration of 12% by weight and these ingredients were reacted at a refluxing temperature for 2 hours. The reaction system was cooled, filtered and then dried to give about 1000 parts by weight of a formaldehyde-modified product (APP-2) as a core material. The average particle size of the formaldehyde-modified product was found to be about 17 μm.

Example 1

To a 500 ml volume reactor equipped with a stirrer, a thermometer, a refluxing device and an inlet port, there were added 100 parts by weight of APP-1 prepared above, 7 parts by weight of styrene monomer, 3 parts by weight of divinylbenzene, 2 parts by weight of potassium persulfate, 200 parts by weight of water and 50 parts by weight of methanol, followed by mixing them at ordinary temperature. Then the reaction system was heated to 80° C. and these ingredients were reacted at that temperature for 6 hours. After cooling the reaction solution, it was filtered, washed with water and then dried to give 110 parts by weight of thermoplastic resin-coated ammonium polyphosphate. The product was observed with an electron microscope and as a result, it could be confirmed that the ammonium polyphosphate particles were uniformly coated with the resin.

Moreover, the resulting thermoplastic resin-coated ammonium polyphosphate was subjected to the foregoing various kinds of quality evaluation tests. The results thus observed are summarized in the following Table 1.

Example 2

The same procedures used in Example 1 were repeated except that APP-2 prepared above was substituted for APP-1 used in Example 1 to thus give 110 parts by weight of thermoplastic resin-coated ammonium polyphosphate. The surface of the product was observed with an electron microscope and as a result, it could be confirmed that the ammonium polyphosphate particles were uniformly coated with the resin.

Moreover, the resulting thermoplastic resin-coated ammonium polyphosphate was subjected to the foregoing various kinds of quality evaluation tests. The results thus obtained are summarized in the following Table 1.

Example 3

The same procedures used in Example 1 were repeated except that the amount of the styrene monomer and divinylbenzene were changed to 10.5 parts by weight and 4.5 parts by weight, respectively to thus give 115 parts by weight of thermoplastic resin-coated ammonium polyphosphate. The surface of the product was observed with an electron microscope and as a result, it could be confirmed that the ammonium polyphosphate particles were uniformly coated with the resin.

Moreover, the resulting thermoplastic resin-coated ammonium polyphosphate was examined by the foregoing various kinds of quality evaluation tests. The results thus obtained are summarized in the following Table 1.

Example 4

To a desk mixer (laboratory mixer), there were added 100 parts by weight of APP-2 prepared above and 2 parts by weight of oleic acid, followed by sufficient mixing and heating in an oven maintained at 50° C. for one hour to thus obtain oleic acid-treated APP-2. Then, to a 500 ml volume reactor equipped with a stirring machine, a thermometer, a refluxing device and an inlet port, there were added 100 parts by weight of the oleic acid-treated APP-2, 7 parts by weight of styrene monomer, 3 parts by weight of divinylbenzene, 2 parts by weight of potassium persulfate, 200 parts by weight of water and 50 parts by weight of methanol, followed by mixing them at ordinary temperature. Then the reaction system was heated to 80° C. and these ingredients were reacted at that temperature for 6 hours. After cooling the reaction solution, it was filtered, washed with water and then dried to give 110 parts by weight of thermoplastic resin-coated ammonium polyphosphate. The particle surface of the product was observed with an electron microscope and as a result, it could be confirmed that the ammonium polyphosphate particles were uniformly coated with the resin.

Moreover, the resulting thermoplastic resin-coated ammonium polyphosphate was inspected for various properties according to the foregoing various kinds of quality evaluation tests. The results thus observed are summarized in the following Table 1.

Example 5

The same procedures used in Example 4 were repeated except that the foregoing APP-3 commercially available was substituted for the APP-2 used in Example 4 to thus give 110 parts by weight of thermoplastic resin-coated ammonium polyphosphate particles. The surface of the product was observed with an electron microscope and as a result, it could be confirmed that the ammonium polyphosphate particles were uniformly coated with the resin.

Moreover, the resulting thermoplastic resin-coated ammonium polyphosphate was subjected to the foregoing various kinds of quality evaluation tests. The results thus obtained are summarized in the following Table 1.

Example 6

To a 500 ml volume reactor equipped with a stirrer, a thermometer, a refluxing device and an inlet port, there were added 100 parts by weight of APP-1 prepared above, 7 parts by weight of acrylonitrile, 3 parts by weight of divinylbenzene, 2 parts by weight of potassium persulfate, 200 parts by weight of water and 50 parts by weight of methanol, followed by mixing them at ordinary temperature. Then the reaction system was heated to 80° C. and these ingredients were reacted at that temperature for 6 hours. After cooling the reaction solution, it was filtered, washed with water and then dried to give 110 parts by weight of thermoplastic resin-coated ammonium polyphosphate. The surface of the product was observed with an electron microscope and as a result, it could be confirmed that the ammonium polyphosphate particles were uniformly coated with the resin.

Moreover, the resulting thermoplastic resin-coated ammonium polyphosphate was inspected for properties according to the foregoing various kinds of quality evaluation tests. The results thus observed are summarized in the following Table 1.

Example 7

The same procedures used in Example 6 were repeated except that the amount of the acrylonitrile was changed to 3 parts by weight and that 4 parts by weight of styrene monomer was additionally added to thus give 115 parts by weight of thermoplastic resin-coated ammonium polyphosphate particles. The surface of the product was observed with an electron microscope and as a result, it could be confirmed that the ammonium polyphosphate particles were uniformly coated with the resin.

Moreover, the resulting thermoplastic resin-coated ammonium polyphosphate was subjected to the foregoing various kinds of quality evaluation tests. The results thus obtained are summarized in the following Table 1.

Example 8

To a 5-liter volume kneader provided with a heating-kneading means, there were introduced 1000 parts by weight of APP-1, 70 parts by weight of styrene monomer, 30 parts by weight of divinyl benzene and 3 parts by weight of potassium persulfate, followed by mixing them at ordinary temperature. Then the reaction system was heated up to 100° C. and maintained at that temperature over 8 hours to give 1102 parts by weight of thermoplastic resin-coated ammonium polyphosphate. The surface of the product was observed with an electron microscope and as a result, it could be confirmed that the ammonium polyphosphate particles were uniformly coated with the resin.

Moreover, the resulting thermoplastic resin-coated ammonium polyphosphate was subjected to the foregoing various kinds of quality evaluation tests. The results thus obtained are summarized in the following Table 1.

Comparative Example 1

The melamine-coated ammonium polyphosphate (APP-1) prepared in Reference Example 1 was subjected to the foregoing various kinds of evaluation test without subjecting it to any treatment. The results thus obtained are summarized in the following Table 1.

Comparative Example 2

The formaldehyde-modified melamine-coated ammonium polyphosphate (APP-2) prepared according to the method used in Reference Example 2 was subjected to the foregoing various kinds of evaluation test without subjecting it to any treatment. The results thus obtained are summarized in the following Table 1.

Comparative Example 3

Hostaflam AP462 (APP-3, available from Hoechst Company) was subjected to the foregoing various kinds of evaluation test without subjecting it to any treatment. The results thus obtained are summarized in the following Table 1.

Comparative Example 4

To a 500 ml volume reactor equipped with a stirrer, a thermometer, a refluxing device and an inlet port, there were added 100 parts by weight of APP-1, 10 parts by weight of styrene monomer, 2 parts by weight of potassium persulfate, 200 parts by weight of water and 50 parts by weight of methanol, followed by mixing them at ordinary temperature. Then the reaction system was heated to 80° C. and these ingredients were reacted at that temperature for 6 hours.

After cooling the reaction solution, it was filtered, washed with water and then dried to give 110 parts by weight of a product.

Then, the resulting product was inspected for properties according to the foregoing various kinds of quality evaluation tests. The results thus obtained are summarized in the following Table 1.

Comparative Example 5

The same procedures used in Example 1 were repeated except that ammonium polyphosphate (110 parts by weight) having the crystalline form II and an average particle size of about 15m was substituted for the melamine-coated ammonium polyphosphate (APP-1), without any pre-treatment to thus obtain thermoplastic resin-coated ammonium polyphosphate. The product was observed with an electron microscope and as a result, it was confirmed that the product was uniformly coated with the resin.

Moreover, the resulting thermoplastic resin-coated ammonium polyphosphate was subjected to the foregoing various kinds of quality evaluation tests. The results thus obtained are summarized in the following Table 1.

TABLE 1

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Water-Solubility (%) | 0.3 | 0.2 | 0.1 | 0.3 | 0.4 | 0.4 | 0.4 | 0.5 |
| Resistance to Acids (%) | 17.5 | 16.7 | 8.4 | 14.3 | 15.0 | 17.5 | 16.0 | 17.1 |
| Resistance to Alkali (%) | 19.5 | 19.3 | 9.1 | 15.5 | 15.7 | 18.0 | 17.6 | 18.7 |
| Resistance to Ions (%) | 11.5 | 10.9 | 6.2 | 9.5 | 10.1 | 9.7 | 9.4 | 12.4 |
| Resistance to Org. Solv. (%) | 0 | 0 | 0 | 0 | 0 | 0 | 0 | 0 |
| Elec. Cond. ($10^{-3}/\Omega \cdot m$) | 0.57 | 0.40 | 0.31 | 0.35 | 0.44 | 0.61 | 0.65 | 0.86 |
| Flame Retard. (O.I.) | 30.4 | 30.8 | 30.0 | 30.5 | 30.7 | 31.0 | 30.4 | 30.6 |
| Impact Res. Test ($kJ/m^2$) | 8.1 | 7.9 | 8.9 | 8.3 | 8.0 | 7.5 | 7.7 | 7.0 |

|  | Comp. Ex. 1 | Comp. Ex. 2 | Comp. Ex. 3 | Comp. Ex. 4 | Comp. Ex. 5 |
|---|---|---|---|---|---|
| Water-Solubility (%) | 19.3 | 0.7 | 4.2 | 2.5 | 56.5 |
| Resistance to Acids (%) | 40.7 | 22.8 | 25.6 | 27.6 | 45.9 |
| Resistance to Alkali (%) | 58.5 | 54.1 | 46.1 | 60.9 | 89.8 |
| Resistance to Ions (%) | 31.3 | 18.9 | 20.2 | 19.2 | 41.6 |
| Resistance to Org. Solv. (%) | 0.02 | 0 | 0 | 8.5 | 0 |
| Elec. Cond. ($10^{-3}/\Omega \cdot m$) | 120.8 | 72.1 | 80.2 | 17.8 | 125.7 |
| Flame Retard. (O.I.) | 30.1 | 30.5 | 30.2 | 29.8 | 30.0 |
| Impact Res. Test ($kJ/m^2$) | 4.1 | 4.5 | 4.3 | 5.8 | 7.0 |

Note:
With regard to the water-solubility, resistance to acids (Res. to Acids), resistance to alkalis (Res. to Alk.), resistance to ions (Res. to ions) and resistance to organic solvents (Res. to Org. Solv.), the lower the measured value, the more excellent the corresponding property.

What is claimed is:

1. A thermoplastic resin-coated ammonium polyphosphate comprising a core material and a coating layer, wherein said core material comprises ammonium polyphosphate and a thermosetting resin, a melamine monomer, or a surface-treating agent; and said coating layer comprises a thermoplastic resin.

2. The thermoplastic resin-coated ammonium polyphosphate as set forth in claim 1 wherein the thermoplastic resin is a member selected from the group consisting of homopolymers of a monomer represented by the following general formula 1 which has, in the molecule, 2 to 5 double bonds capable of undergoing polymerization; copolymers of at least two of these monomers represented by the general formula 1; copolymers of at least one monomer represented by the following general formula 1 with at least one monomer represented by the following general formula 2; and mixtures thereof:

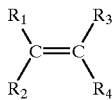

wherein $R_1$, $R_2$ and $R_3$ of formula 1 may be the same or different from one another and each represents a member selected from the group consisting of a hydrogen atom, halogen atoms, cyano groups, cyanoalkyl groups having 1 to 8 carbon atoms, carboxyl groups, alkyl groups having 1 to 10 carbon atoms, alkyl ether groups having 2 to 15 carbon atoms, aminoalkyl groups having 1 to 10 carbon atoms, alkenyl groups having 2 to 12 carbon atoms, alkynyl groups having 2 to 1 2 carbon atoms, alkyl ester groups having 2 to 18 carbon atoms and alkoxy groups having 1 to 1 4 carbon atoms, provided that if one of the groups $R_1$, $R_2$ and $R_3$ is a carboxyl group or an alkyl ester group having 2 to 18 carbon atoms, the other groups represent groups different from the functional group and $R_4$ represents a group represented by the following general formula 3 or 4;

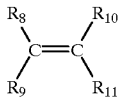

wherein $R_8$, $R_9$, $R_{10}$ and $R_{11}$ of formula 2 are the same or different from each other and each represents a member selected from the group consisting of a hydrogen atom, halogen atoms, cyano groups, cyanoalkyl groups having 1 to 8 carbon atoms, carboxyl groups, alkyl groups having 1 to 10 carbon atoms, alkyl ether groups having 2 to 15 carbon atoms, aminoalkyl groups having 1 to 10 carbon atoms, aromatic groups having 6 to 32 carbon atoms and alkyl ester groups having 2 to 18 carbon atoms, provided that if one of the groups $R_8$, $R_9$, $R_{10}$ and $R_{11}$ is a carboxyl group or an alkyl ester group having 2 to 18 carbon atoms, the other groups represent groups different from the functional group;

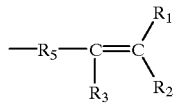

wherein $R_1$ and $R_2$ of formula 3 are the same as those defined above in connection with the general formula 1, respectively and $R_5$ is a group represented by the following general formula 5, 6, 7 or 8;

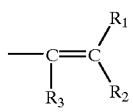

wherein $R_1$, $R_2$ and $R_3$ of formula 4 are the same as those defined above in connection with the general formula 1, respectively;

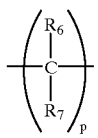

wherein $R_6$ and $R_7$ of formula 5 are the same or different from one another and each represents a member selected from the group consisting of a hydrogen atom, halogen atoms, cyano groups, cyanoalkyl groups having 1 to 8 carbon atoms, aminoalkyl groups having 1 to 10 carbon atoms, aromatic groups having 6 to 32 carbon atoms and those represented by the foregoing general formula 3 or 4 and p is a numeral ranging from 1 to 12;

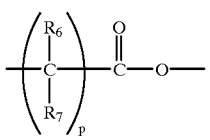

wherein $R_6$ and $R_7$ and p of formula 6 are the same as those defined above in connection with the formula 5, respectively;

—Ar—  7 wherein Ar of formula 7 represents an aromatic residue having 6 to 32 carbon atoms;

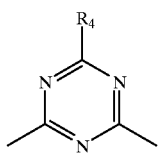

wherein $R_4$ of formula 8 is the same as that defined above in connection with the general formula 3.

3. The thermoplastic resin-coated ammonium polyphosphate as set forth in claim 2 wherein the monomer represented by the general formula 1 is a conjugated diene monomer or a non-conjugated diene monomer, which has two polymerizable double bonds.

4. The thermoplastic resin-coated ammonium polyphosphate as set forth in claim 2 wherein the thermoplastic resin is used in an amount ranging from 1 to 40 parts by weight per 100 parts by weight of the core material.

5. The thermoplastic resin-coated ammonium polyphosphate as set forth in claim 2, wherein the core material is ammonium polyphosphate covered or encapsulated in a thermosetting resin.

6. The thermoplastic resin-coated ammonium polyphosphate as set forth in claim 2, wherein the core material is ammonium polyphosphate covered or modified with a melamine monomer.

7. The thermoplastic resin-coated ammonium polyphosphate as set forth in claim 2, wherein the core material is surface-treated ammonium polyphosphate obtained by adhering, adsorbing or absorbing a surface-treating agent on or to the surface of ammonium polyphosphate.

8. The thermoplastic resin-coated ammonium polyphosphate as set forth in claim 1 wherein the thermoplastic resin is used in an amount ranging from 1 to 40 parts by weight per 100 parts by weight of the core material.

9. The thermoplastic resin-coated ammonium polyphosphate as set forth in claim 8 wherein the monomer represented by the general formula 1 is a conjugated diene monomer or a non-conjugated diene monomer, which has two polymerizable double bonds.

10. The thermoplastic resin-coated ammonium polyphosphate as set forth in claim 1 wherein the core material is ammonium polyphosphate covered with or encapsulated in a thermosetting resin.

11. The thermoplastic resin-coated ammonium polyphosphate as set forth in claim 10 wherein the thermosetting resin is at least one member selected from the group consisting of melamine resins, modified melamine resins, guanamine resins, epoxy resins, phenolic resins, urethane resins, urea resins and silicone resins.

12. The thermoplastic resin-coated ammonium polyphosphate as set forth in claim 10 wherein the surface-treating agent is at least one member selected from the group consisting of saturated or unsaturated fatty acids having 6 to 25 carbon atoms, metal salts of saturated or unsaturated fatty acids having 6 to 25 carbon atoms, silane coupling agents, titanate coupling agents, aluminate coupling agents, anionic surfactants, cationic surfactants, nonionic surfactants, amphoteric surfactants and fluorine atom-containing surfactants.

13. The thermoplastic resin-coated ammonium polyphosphate as set forth in claim 10 wherein the ammonium polyphosphate has a phosphorus atom concentration ranging from 20 to 31% by weight.

14. The thermoplastic resin-coated ammonium polyphosphate as set forth in claim 1 wherein the core material is ammonium polyphosphate covered or modified with a melamine monomer.

15. The thermoplastic resin-coated ammonium polyphosphate as set forth in claim 1 wherein the core material is surface-treated ammonium polyphosphate obtained by adhering, adsorbing or absorbing a surface-treating agent on or to the surface of ammonium polyphosphate.

16. The thermoplastic resin-coated ammonium polyphosphate as set forth in claim 1 wherein it has an average particle size ranging from 0.1 to 50 μm.

17. A flame retardant comprising, as an effective component, the thermoplastic resin-coated ammonium polyphosphate as set forth in claim 1.

18. A process for producing thermoplastic resin-coated ammonium polyphosphate comprising the step of subjecting, to a polymerization reaction, a monomer represented by the general formula 1 and a monomer represented by the general formula 2 as an optional component, in the presence of a catalyst, in the presence or absence of a reaction solvent, on the surface of a core material which comprises ammonium polyphosphate and a thermosetting resin, a melamine monomer or a surface-treating agent.

19. The process for producing thermoplastic resin-coated ammonium polyphosphate as set forth in claim 18 wherein the temperature for the polymerization of the monomers ranges from 20 to 150° C.

20. The process for producing thermoplastic resin-coated ammonium polyphosphate as set forth in claim 19 wherein it comprises the steps of introducing, into a reactor, the core material, and 0.1 to 40 parts by weight of the monomer of the formula 1, 0.1 to 39.9 parts by weight of the monomer of the formula 2, 0.1 to 10 parts by weight of the catalyst, per 100 parts by weight of the core material, and a reaction solvent and then reacting the monomers at a temperature ranging from 20 to 150° C. for 0.5 to 50 hours.

21. The process for producing thermoplastic resin-coated ammonium polyphosphate as set forth in claim 18 wherein it comprises the steps of introducing, into a reactor, the core material, and 0.1 to 40 parts by weight of the monomer of the formula 1, 0.1 to 39.9 parts by weight of the monomer of the formula 2, 0.1 to 10 parts by weight of the catalyst, per 100 parts by weight of the core material, and a reaction solvent and then reacting the monomers at a temperature ranging from 20 to 150° C. for 0.5 to 50 hours.

* * * * *